United States Patent
Doglioni Majer (12)

(10) Patent No.: US 10,368,688 B2
(45) Date of Patent: Aug. 6, 2019

(54) DEVICE AND METHOD FOR HEATING WATER IN A MACHINE FOR MAKING AND DISPENSING DRINKS

(71) Applicant: RHEAVENDORS SERVICES S.p.A., Como (IT)

(72) Inventor: Carlo Doglioni Majer, Como (IT)

(73) Assignee: RHEAVENDORS SERVICES S.p.A. (IT)

( * ) Notice: Subject to any disclaimer, the term of this patent is extended or adjusted under 35 U.S.C. 154(b) by 147 days.

(21) Appl. No.: 15/032,641

(22) PCT Filed: Oct. 28, 2014

(86) PCT No.: PCT/IB2014/002243
§ 371 (c)(1),
(2) Date: Apr. 28, 2016

(87) PCT Pub. No.: WO2015/063572
PCT Pub. Date: May 7, 2015

(65) Prior Publication Data
US 2016/0287010 A1    Oct. 6, 2016

(30) Foreign Application Priority Data

Oct. 29, 2013  (EP) ..................... 13005127

(51) Int. Cl.
*H05B 6/10* (2006.01)
*H05B 6/04* (2006.01)
(Continued)

(52) U.S. Cl.
CPC ............. *A47J 31/542* (2013.01); *A47J 31/60* (2013.01); *F24H 1/121* (2013.01); *F24H 9/1818* (2013.01);
(Continued)

(58) Field of Classification Search
CPC ......... A47J 31/542; A47J 31/60; H05B 6/108; H05B 2206/022; F24H 1/121;
(Continued)

(56) References Cited

U.S. PATENT DOCUMENTS

| 852,854 A | 5/1907 | Shoenberg |
|---|---|---|
| 1,116,339 A | 11/1914 | Weeks |

(Continued)

FOREIGN PATENT DOCUMENTS

| DE | 10350064 | 6/2005 |
|---|---|---|
| EP | 2044869 | 4/2009 |
| FR | 583000 | 1/1925 |
| WO | 9724052 | 7/1997 |
| WO | 2008139205 | 11/2008 |
| WO | 2013084180 | 6/2013 |

OTHER PUBLICATIONS

EPO written opinion. CF form 1507. App. No. 13 005 127. 9.
(Continued)

*Primary Examiner* — Quang T Van
(74) *Attorney, Agent, or Firm* — The Belles Group, P.C.

(57) ABSTRACT

A device for heating water in a machine for making and dispensing beverages is provided. The device includes at least one heating metallic duct and a winding of electromagnetic induction. The device is part of a heating and feeding assembly wherein, by a logical unit, it is possible to carry out a method in which, for every beverage type the machine can dispense, the temperature of heated water is led to a specific temperature value that can be selected by the user.

19 Claims, 5 Drawing Sheets

(51) Int. Cl.
| | |
|---|---|
| *F24H 1/18* | (2006.01) |
| *B01D 17/12* | (2006.01) |
| *A47J 31/54* | (2006.01) |
| *A47J 31/60* | (2006.01) |
| *F24H 1/12* | (2006.01) |
| *F24H 9/18* | (2006.01) |
| *F24H 9/20* | (2006.01) |
| *G05D 23/19* | (2006.01) |

(52) U.S. Cl.
CPC ....... *F24H 9/2028* (2013.01); *G05D 23/1931* (2013.01); *H05B 6/108* (2013.01); *F24H 2250/08* (2013.01); *H05B 2206/022* (2013.01)

(58) Field of Classification Search
CPC .. F24H 9/2028; F24H 9/1818; F24H 2250/08; G05D 23/1931
USPC .......... 219/643, 618, 629, 672, 630; 210/97, 210/223, 149, 512.1; 392/488, 466, 441
See application file for complete search history.

(56) References Cited

U.S. PATENT DOCUMENTS

| | | |
|---|---|---|
| 3,335,252 A | 8/1967 | Rolfes |
| 5,262,621 A | 11/1993 | Hu et al. |
| 2005/0098486 A1* | 5/2005 | Hung ...................... C02F 1/484 210/97 |
| 2008/0223850 A1* | 9/2008 | Nakao ...................... H05B 6/06 219/618 |

OTHER PUBLICATIONS

PCT Search report. International App. No. PCT/IB2014/002243. Filing date. Oct. 28, 2014.
EPO search report App. No. 13 00 5127 dated Jun. 30, 2014.
PCT Written Opinion, International App. No. PCT/IB2014/002243, Filing date. Oct. 28, 2014.
Office Action dated Mar. 12, 2018 for corresponding Taiwanese Patent Application No. 103137316.

* cited by examiner

DEVICE AND METHOD FOR HEATING WATER IN A MACHINE FOR MAKING AND DISPENSING DRINKS

RELATED APPLICATIONS

This application is a US national phase application of international application No. PCT/IB2014/002243, filed 28 Oct. 2014, which designates the US and claims priority to European Application No. EP 13005127.9 filed 29 Oct. 2013, the contents of each of which are hereby incorporated by reference as if set forth in their entireties.

FIELD OF THE INVENTION

The present invention concerns a device and a method for heating water in a machine for making and dispensing beverages such as, for example, coffee, tea, chocolate; such a machine comprises a feeding and heating assembly adapted to carry out such a method.

BACKGROUND OF THE INVENTION

Machines for making and dispensing hot beverages provided with devices for heating water are known, generally defined as boilers or kettles; such devices, usually supplied by electric current, are able to heat the water contained in a tank, by means of a heating element.

The heating element, usually made of a resistive material, is permanently dipped in the water contained in the tank; a potential difference is applied at the ends of the heating element, then an electric current is generated that, due to Joule effect, dissipates energy in form of heat by heating the water. In practice, it is the same technique used for heating water inside a conventional water-boiler.

It is then necessary to maintain the water contained in the heating device at a desired temperature, also when the machine is not operating, so that to assure a dispensing of the beverage at the desired temperature without long waiting times. Then, if the machine is not operative for a long time, there will be a great energy consumption for maintaining the water at high temperatures (usually higher than 85° C.).

For example, in case of boilers used for the preparation of beverages by means of soluble substances, at the end of every dispensing, the level of hot water contained in the boiler is reduced and water at ambient temperature is entered in order to fill again the boiler. Then, there is a reducing in the whole temperature of water and, to assure that the following dispensing of a beverage will happen at the desired temperature, it is necessary a more or less long waiting time to heat again the water; the waiting time will depend on the amount of hot water fed in one or more preceding dispensing.

In addition to the temperature, an important specification to be fulfilled is the flow rate of the fed hot water, above all depending from the beverage type to be made; for example, in case of beverage produced by means of soluble substances, a considerable flow rate of hot water is required (at least 10 cc/s); it is not simple to satisfy this specification, in fact with a high flow rate of fed hot water there will be a quick decrease of temperature of water contained in the tank, resulting in long waiting times for a following dispensing or else obtaining a beverage whose soluble substance could give some lumps.

The main problems related to water heating, in machines for making and dispensing beverages, are due to thermal inertia with which a determined water mass is heated; in order to have a quick water heating the phenomenon of electromagnetic induction can be used for generating eddy currents inside an electrically conductive element in contact with the water to be heated; the eddy currents dissipate energy, because of Joule effect, in form of warmth heating the conductive element and consequently the water contacting therewith.

It is known that electromagnetic induction heaters have the quality of heating rapidly the water flowing inside a metal pipe in which the eddy currents are induced.

U.S. Pat. No. 5,262,621 in the name of Industrial Technology Research Institute, shows an apparatus for heating the water flowing inside a metal pipe in which a winding of electromagnetic induction is wound. The winding is supplied with an AC voltage, hence, inside the pipe, eddy currents are generated which heat the pipe thereby increasing the temperature of water flowing in its inside. The water passes through the pipe by gravity, therefore no dispensing of hot water with high flow rate is arranged. Also in DE10350064 is shown a device for heating water in a coffee machine in which the winding of electromagnetic induction is wound around a chromium-plated steel pipe having a thin wall.

Anyway, the afore said heaters have a problem: inside the heating pipe the limescale contained in the water will deposit because of heating; then, inside the heating pipe, an inner coating of limescale will form that, at the beginning, limits the heat conduction from the pipe towards the water and, successively, will be able to block the inside of the heating pipe with the relative damage of the device or the whole machine. Therefore, in order to avoid damages of the machine or the replacement of the heater, a cleaning cycle will be periodically carried out, by means of descaling substances, to remove the limescale from the heating pipe.

For example EP2044869 shows an induction heater provided with an ultrasound generator; the heater comprises a cylindrical casing made of ferromagnetic material on which a winding of electromagnetic induction is wound; inside the ferromagnetic casing there is a flow path for the water to be heated and an ultrasound generator is integrated at one end of said casing; in this way the limescale formation inside the heater is hindered by the ultrasonic vibrations made by the ultrasound generator.

Then, the above mentioned heaters have the problem of needing an accurate maintenance of the heating duct. In case in which the heating duct is blocked, the replacement of these heaters is a complex and expensive operation.

SUMMARY OF THE INVENTION

Object of the present invention is to realize a device for heating water in a machine for making and dispensing beverages that avoids the drawbacks of the known art. Further object of the present invention is to provide a device for heating the water rapidly, in a machine for making and dispensing beverages, which is inexpensive, simple to use, with a reduced power consumption and whose replacement is simple, quick and cheap.

This and further objects are achieved by the present invention through a device for heating water in a machine for making and dispensing beverages.

In particular, according to the present invention, the device for heating water in a machine for preparing and dispensing beverages, comprises at least one metal duct for the water flow between an inlet and an outlet and at least one winding of electromagnetic induction, characterized in that the loops of said winding are wound around a spool made of an electrically insulating material having a cavity inside which said metal duct is housed and in that said metal duct and said spool are at least partially separated by a gap inside said cavity.

In fact, the peculiar aspect of the present invention is that in case of malfunctions, such as for example a reduced efficiency or a blocking of the heating duct due to the limescale deposit, it is possible to replace only such a duct simply and rapidly; there is not the need of replacing the whole heater as it is designed so that the winding of electromagnetic induction and the metal duct are two physically-separated pieces; this allows a simple maintenance of the electric part (winding of electromagnetic induction) and the hydraulic part (heating duct), separately.

In detail, the device according to the present invention comprises at least one electric power supply circuit for said winding and, by using the phenomenon of electromagnetic induction, eddy currents are generated inside the metal duct that heat such a duct thanks to the Joule effect.

The device according to the present invention is able to lead the water to a temperature higher than 75° C. also for dispensing with a flow rate greater than 10 cc/s. This is obtained because the water is heated almost instantaneously by passing through the metal duct that is made of electrically conductive element, preferably of ferromagnetic material, with such a thickness and section to have a large surface contacting the water to be heated in its inside.

To optimize the space, advantageously the duct has a spiral shape and, preferably, the inlet and the outlet of such a duct are made on the same end so that the replacement of the heating element could be easy for an operator.

To further simplify the replacement of the heating duct, push-in fittings are present, known in the art, which allow connecting and disconnecting the heating duct from the rest of the hydraulic circuit without interfering with the winding of electromagnetic induction.

Further object of the present invention is an assembly for feeding and heating the water in a machine for making and dispensing beverages according to claim 6 and respective dependent claims, comprising the afore said device for heating water according to the present invention and a pump for the flow of water to be heated inside the heating duct, the water coming from an independent tank or the main connection, for example.

The assembly can further comprise a water tank, typically name "air break"; such a tank is substantially a chamber that, usually, is present in automatic dispensing machines or in general in machines connected directly with the water main. The air break chamber separates the water main from the hydraulic circuit of the dispensing machine in order to avoid that possible bacteria or microorganisms, present inside the hydraulic circuit of the machine, could pollute the whole water main.

The separation happens by an air layer; in particular, the air break chamber, hereinafter named simply separating chamber, is typically provided with an inlet for the water coming directly from the water main and an outlet towards the hydraulic circuit of the dispensing machine. The inlet is placed at a height greater than the outlet and thanks to a level sensor, typically a float, the level of water contained inside the separating chamber cannot reach such an inlet; then a separation between the water main and the hydraulic circuit of the dispensing machine is obtained by an air layer inside the separating chamber.

The feeding and heating assembly according to the present invention, in one of its embodiments, can comprise a separating chamber that, in this case, is provided with two inlets and one outlet; the outlet of the separating chamber is hydraulically connected to the inlet of the heating duct, a first inlet of the separating chamber is connected to the water main and a second inlet of the separating chamber is connected to the outlet of the heating duct by means of a three-way electrovalve. It is then provided the possibility of diverting the flow of hot water selectively from the outlet of the heating duct towards an outlet duct or towards the separating chamber. In this way, it is possible to carry out one or more pre-heating cycles of the water present in the separating chamber if the temperature and/or the flow rate of hot water to be heated are high.

Another object of the present invention is a method for feeding and heating water, in a machine for making and dispensing beverages through an assembly comprising a device for heating water according to the present invention. The method provides for heating and feeding water at a determined temperature that can be selected by the user, and with a flow rate determined as a function of the type of beverage to be dispensed.

BRIEF DESCRIPTION OF THE DRAWINGS

Further aspects and objects of the present invention will become more evident from the description below, made for illustrative and not limitative purposes, with reference to the accompanying schematic drawings, in which.

MODES FOR IMPLEMENTING THE INVENTION

Figure 1:
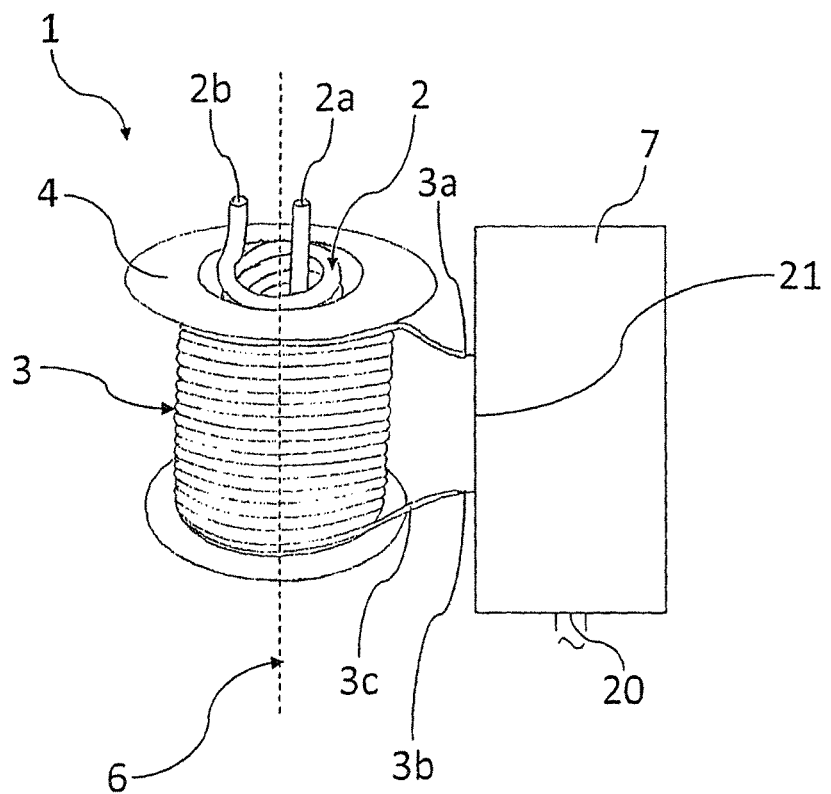
FIG. 1 is a perspective view of an embodiment of the device according to the present invention.
Figure 2:
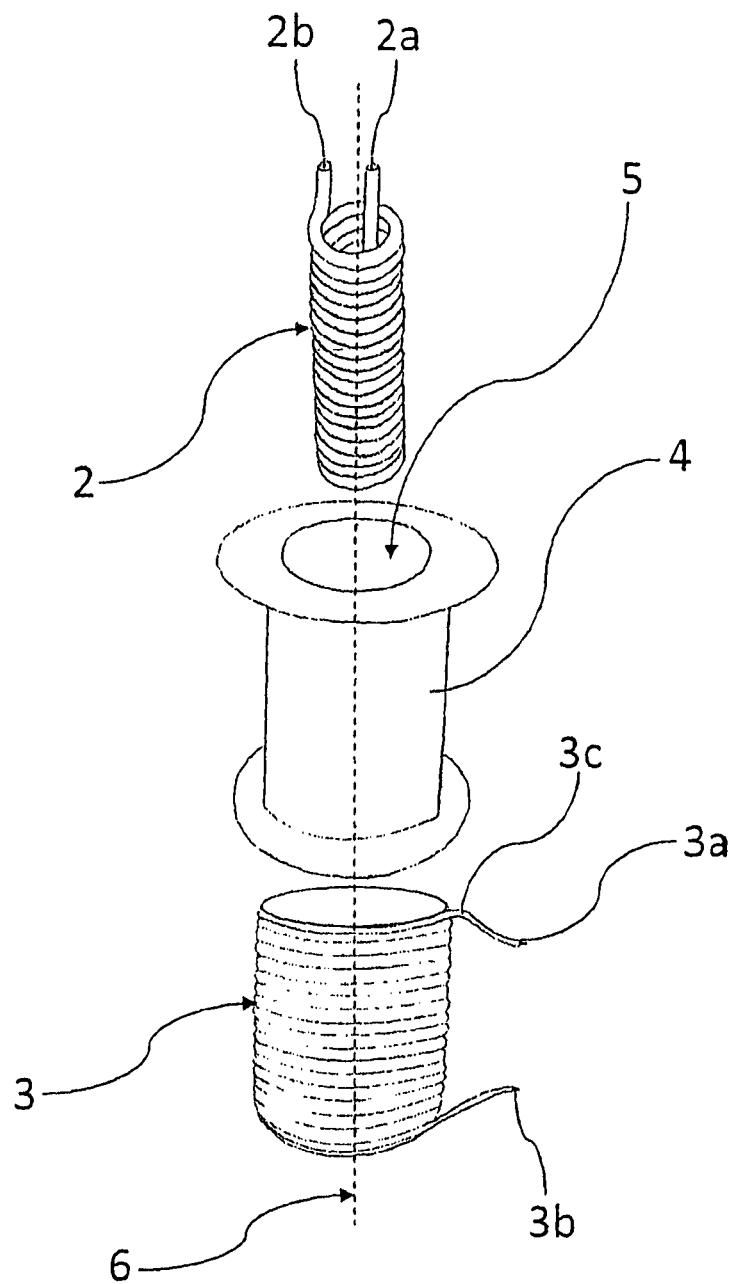
FIG. 2 is an exploded view of the device of FIG. 1.

Referring to FIGS. 1 and 2, the device 1 for heating water in a machine for making and dispensing beverages comprises a metal duct 2 for the water flow between an inlet 2a and an outlet 2b and a winding of electromagnetic induction 3 whose loops are wound around a spool 4, made of an electrically insulating material. The spool 4 has a cavity 5 with a substantially cylindrical shape, with a symmetry axis 6 coincident with that of the winding 3. In the particular shown embodiment, the metal duct 2 is made of electrically conductive material, preferably of ferromagnetic material and has the shape of a cylindrical spiral.

The metal duct 2 is housed inside the cavity 5, so that the spool 4 and the metal duct 2 are separated at least in part by a gap, therefore in such a way that they are physically separated, so in such a way that the duct 2 could loosely slide inside the cavity 5.

With the term "gap" is meant a space region in which, substantially, there are no mechanical constraints.

The spiral shape has been selected to maximize the water mass the metal duct 2 can contain and to render the structure of such a duct 2 as much as possible compact.

In other words, the spool 4 made of insulating material, on which the loops of the winding 3 of electromagnetic induction are wound, and the metal duct 2, are two physically separated parts.

In particular, the spool 4 is constrained to a supporting structure (not shown) of a machine for preparing beverages, whereas the metal duct 2, which is hydraulically connected to a hydraulic circuit of the same machine, substantially has no mechanical constraints with the spool 4. Then, by disconnecting the metal duct 2 from the hydraulic circuit, it is possible to draw out the duct 2 from the cavity 5 maintaining unchanged the rest of the system. For example, if the duct has to be replaced because of malfunction or maintenance, the drawing out of the duct 2 from the cavity 5 is simple and quick for an operator thanks to the presence of the push-in fittings 18a, 18b, known in the art, connecting the inlet 2a and the outlet 2b of the duct 2 to the rest of the hydraulic circuit of the machine for preparing beverages, respectively.

According to the embodiment herein shown in FIGS. 1 and 2, the insulating spool 4, the cavity 5 and the winding of electromagnetic induction 3 have a substantially cylindrical shape with symmetry axes coincident with an axis 6.

Referring to FIGS. 1 and 2, the metal duct 2 has its own symmetry axis, which in the particular shown embodiment, is parallel and coincident with the axis 6.

The loops of the winding 3 of electromagnetic induction comprise an electric wire 3c, sheathed with an electrically insulating material, wound around the insulating spool 4. The wire 3c has two ends 3a and 3b, with which the winding 3 can be electrically powered.

The device 1 according to the present invention further comprises an electric power supply circuit 7 applying an AC voltage at the ends 3a, 3b of the winding 3. An AC current in then generated, flowing inside the winding 3 and, consequently, a magnetic field alternating too is produced, whose flow lines pass through the winding 3 and particularly inside the cavity 5 of the spool 4 where the metal duct 2 is housed. To minimize the losses due to heat dissipated by the current flowing in the loops of the winding 3, the electric wire 3c is realized with a large section and a reduced resistivity value, in order to have a resistance value as low as possible.

As afore said, by supplying the winding 3 with the circuit 7 an alternating magnetic field is generated inside the cavity 5, whose flow lines pass through the metal duct 2 housed inside the cavity 5. For the Faraday law, the flow variation of the magnetic field generates, inside the metal duct 2, eddy currents, also known as "Foucault currents", which heat the duct 2 because of Joule effect and, consequently, the water flowing in its inside.

Advantageously, the duct 2 is preferably made of ferromagnetic material. With a duct 2 made of ferromagnetic material, the lines of magnetic field gather more on the duct 2 and do not disperse in the space between the winding 3 and the duct 2 inside the cavity 5, optimizing the generation of eddy currents.

The electric power supply circuit 7 supplies the winding 3 with a determined power and applies an AC voltage at the ends 3a, 3b of the winding 3 at a determined frequency that is preferably higher than 20 kHz. In particular, the power circuit 7 has an input 20 connected to the electric network, and an output 21 connected to the terminals 3a and 3b of the winding 3. Through methods known in the art, the AC voltage applied by the electric network is modulated by the circuit 7 to increase the power frequency to a value higher than 20 kHz. In other terms, the circuit 7 takes, for example, an AC voltage at 50 Hz from the electric network and supplies the winding 3 with a determined power and an AC voltage at a frequency higher than 20 Hz.

By supplying the winding 3 with frequencies higher than 20 Hz, two advantages are achieved: the vibrations produced by the device 1 fall within the ultrasound field, beyond the audible frequencies in order to avoid irritating noise or humming; in addition, the generated ultrasounds hinder the limescale deposition on the inner walls of the duct 2.

By changing the oscillation frequency the amplitude of induced currents can be changed and then the temperature of the duct 2 can be changed as a function of such a frequency. In particular, when the oscillation frequency of the voltage at the ends of the winding 3 reaches a specific frequency value (resonance frequency), the efficiency of the circuit 7 is the maximum and the dissipated energy, in the guise of heat from the duct 2, is the maximum too. The coupling between the winding 3 and the duct 2 determines the resonance frequency value that depends from a lot of factors such as, e.g., the shape, the size and the material of which the heating duct 2 is made, as well as the type of winding 3. Therefore, by supplying the winding 3 with a determined power and an AC voltage having an oscillation frequency equal to the resonance frequency value, the duct reaches the maximum temperature. Such a temperature can be decreased and led to a desired and determined value by adjusting the oscillation frequency of the AC voltage with which the winding 3 is supplied. In particular, by supplying the winding 3 with an AC voltage with an oscillation frequency higher or lower than the resonance frequency, less energy is dissipated in the guise of heat from the duct 2, which reaches a temperature lower than the temperature reached by supplying the winding with an AC voltage having an oscillation frequency equal to the resonance one. Therefore, it is possible to lead the temperature of the duct 2 to a particular desired value by adjusting the oscillation frequency of the AC voltage with which the circuit 7 supplies the winding 3.

Figure 3:
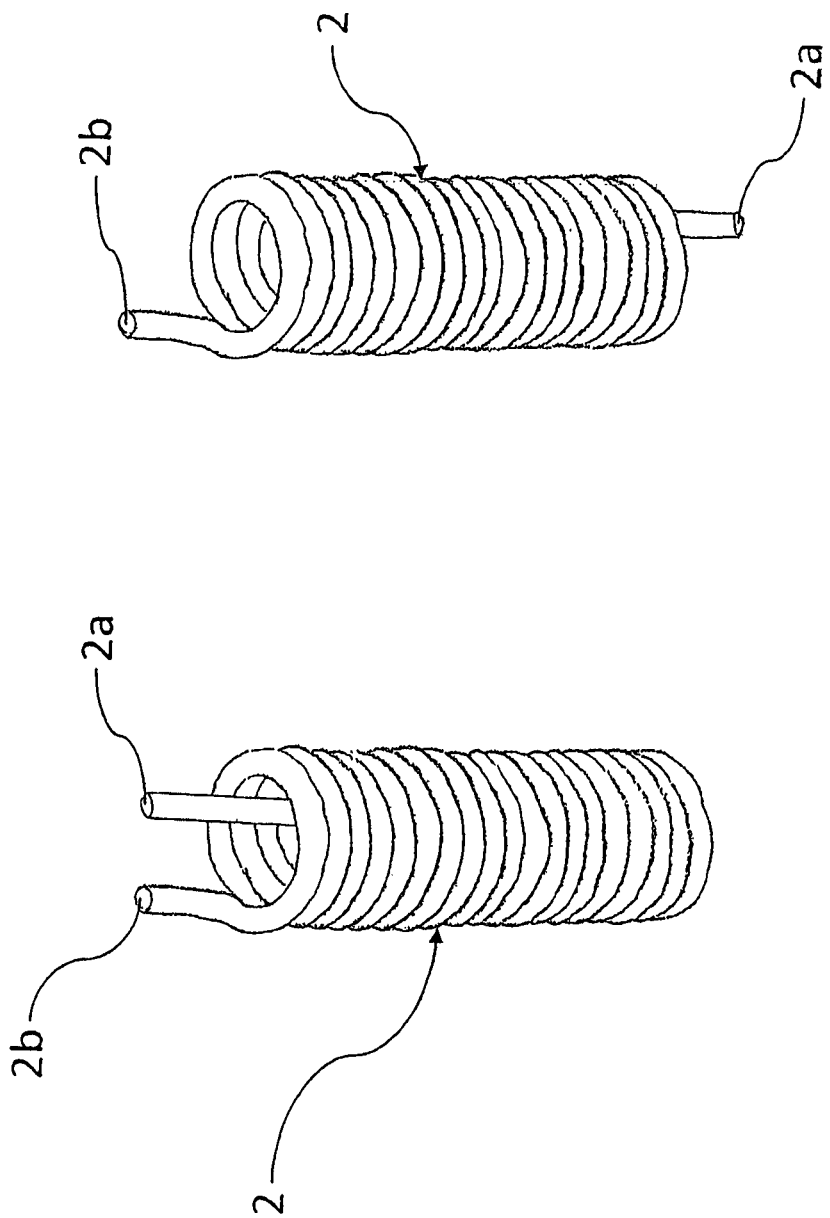
FIGS. 3A and 3B are a perspective view of two embodiments of the heating duct of the device according to the present invention.

Referring to FIGS. 3A and 3B, the metal duct 2 has an inlet 2a and an outlet 2b for the water flow. The inlet 2a and the outlet 2b can be placed on the same end of the duct 2, as in the embodiment shown in FIG. 3A, or on different ends, such as for example in the embodiment shown in FIG. 3B.

In a preferred embodiment, the use of at least one metal duct 2 is provided, in which the inlet 2a and the outlet 2b for the water flow are positioned on the same end of the duct 2; for example, a duct 2 in the shape of a cylindrical spiral as that shown in FIG. 3B, has the inlet 2a and the outlet 2b for the water flow on opposite ends; by extending the outlet 2b or the inlet 2a of the duct 2 and passing said extension from the spiral center, a duct is obtained in which both the inlet 2a and the outlet 2b are positioned on the same end, as shown in FIG. 1, in FIG. 2 and in FIG. 3A. The presence of the inlet 2a and the outlet 2b on the same end of the duct 2 allows a possible replacement of the duct 2 from the cavity 5 simpler and quicker than the embodiment in which the inlet 2a and the outlet 2b are placed on different ends.

For example, the duct 2 in an embodiment can have a spiral shape, as that shown in FIG. 3A or 3B, with a wall thickness comprised between 0.3 mm and 1.5 mm and a section with inner diameter comprised between 3 mm and 15 mm and a weight comprised between 30 g and 70 g.

The duct 2 is preferably made of food stainless steel such as, for example, EN 1.4509 having also good ferromagnetic features and a resonance frequency value of about 25 kHz.

Figure 4:
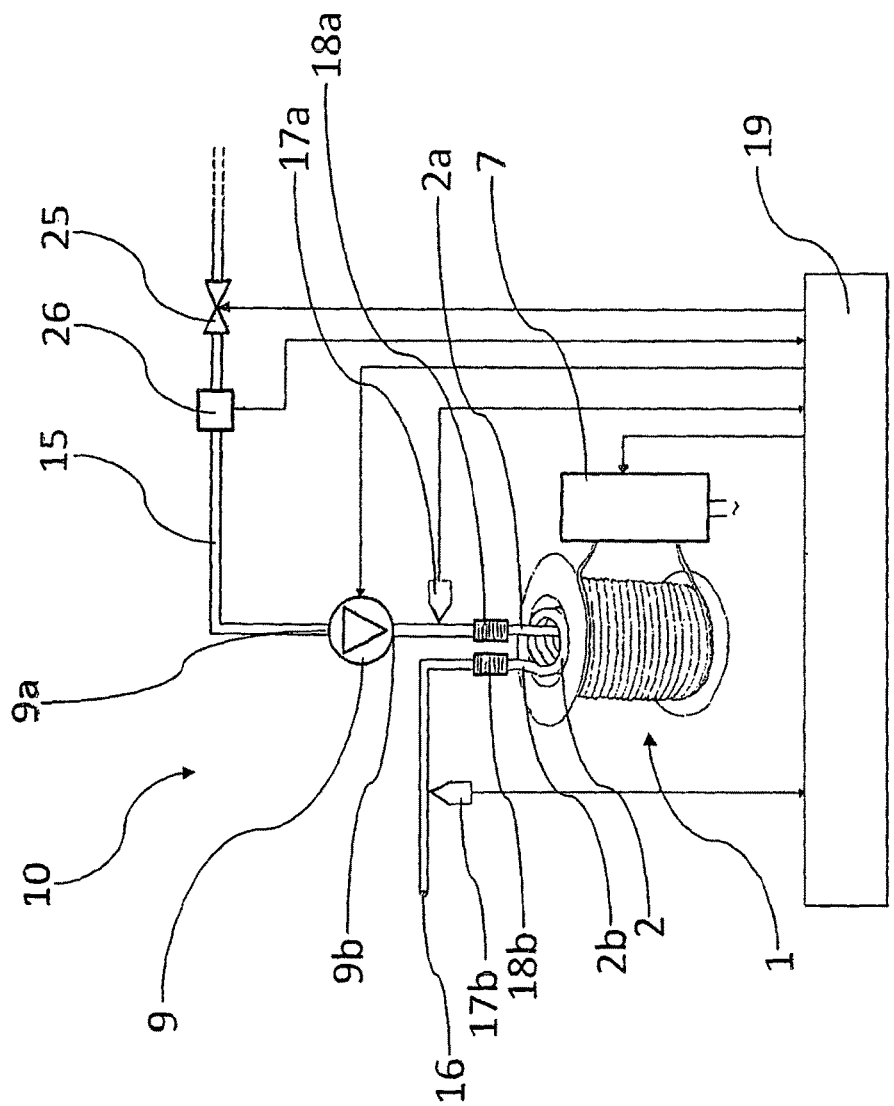
FIG. 4 is a block diagram of an embodiment of the feeding and heating assembly through which the method for feeding and heating water according to the present invention is carried out.

FIG. 4 shows an assembly 10 for feeding and heating water in a machine for making beverages, comprising a pump 9 with an inlet 9a and an outlet 9b and a device 1 for heating water according to the present invention.

The inlet 9a of the pump 9 is hydraulically connected to an unit for the water supply, such as for example an independent tank (not shown), via a duct 15 and an electrovalve 25; the outlet 9b of the pump 9 is hydraulically connected to the inlet 2a of the duct 2. The pump 9 can preferably have a variable speed and can be controlled in such a way that the water pumped inside the duct 2 has a determined flow rate corresponding to the beverage type to be prepared.

As previously described, to facilitate and speed up the drawing out of the duct 2 from the cavity 5, push-in fittings 18a, 18b, known in the art, connect the inlet 2a and the outlet 2b of the duct 2 with the rest of the hydraulic circuit of the assembly 10, respectively.

The assembly 10 further comprises at least one displacement meter 26 arranged upstream the inlet 2a of the duct 2, preferably upstream the inlet 9a of the pump 9 and at least one temperature sensor arranged at least next the end 2b of the duct 2 of the device 1 to heat the water. The particular embodiment shown in FIG. 4 provides two temperature sensors 17a and 17b placed, respectively, at the inlet 2a and the outlet 2b of the duct 2. For example, at least one of the temperature sensors 17a, 17b can be a thermocouple. Embodiments in which an assembly 10 for feeding and heating water comprises a different number of temperature sensors, known in the art, are provided, the sensors being placed at different points of the hydraulic circuit, of which at least one temperature sensor is placed at least next to the outlet 2b of the duct 2, while remaining in the protection scope of the present invention.

In general, the temperature sensor 17a, if present, can be placed substantially upstream the inlet 2a of the heating duct 2 in order to measure the temperature of water coming into the duct 2, whereas the sensor 17b can be placed substantially downstream the outlet 2b of the heating duct 2 in order to measure the temperature of water coming out of the duct 2.

The assembly 10 further comprises a logical unit 19 for acquiring the temperature values measured by the temperature sensors 17a, 17b. The logical unit 19 processes the acquired values measured by the sensors 17a, 17b and determines the temperature of water flowing inside the duct 2.

Therefore, the logical unit 19 adjusts the oscillation frequency and/or the output of electric power from the power circuit 7 so that the temperature of water flowing inside the duct 2 could reach a determined temperature the user selected.

In particular, the logical unit 19 controls the electric power supply circuit 7 by adjusting the oscillation frequency thereof. Based on temperature values measured by the sensors 17a and 17b, the logical unit 19 determines the oscillation frequency with which the power circuit 7 supplies the winding of electromagnetic induction 3.

Therefore, the power circuit 7 takes, for example, an AC voltage at 50 Hz from the electric network and supplies the winding 3 with an AC voltage at a frequency determined by the logical unit 19.

The logical unit 19 further adjusts the electric power transferred from the power circuit 7 to the winding 3 by methods known in the art, for example by a PWM modulation of the voltage output of the circuit 7.

Then the logical unit 19 controls the power circuit 7 so that such a voltage provided to from the circuit 7 to the winding 3 has a determined frequency and/or a determined electric power.

The voltage at the ends of the winding 3 can then be equal to zero, i.e. the logical unit 19 controls the switching on and off of the power circuit 7. For example, in case in which the temperature sensors 17a and 17b detect a temperature higher than an upper determined threshold, the logical unit 19 controls the switching off of the power circuit 7 or, vice versa, in case in which the temperature sensors 17a and 17b detect a temperature lower than a determined lower threshold, the logical unit 19 controls the switching-on of the power circuit 7.

The logical unit 19 determines, by means of the displacement meter 26, the volume of water pumped to the duct 2 by the pump 9. In addition, the logical unit 19 can determine the water flow rate and in particular, if the pump is of the constant flow rate type, the logical unit 19 determines the flow rate value from an inner memory in which such a value is stored. In case in which the pump 9 has a variable flow rate, i.e. in which the rotation speed of the pump can be adjusted, the logical unit 19 can determine the flow rate value based on the beverage type selection and can further adjust the speed of the pump 9 so that the water is fed from the outlet duct 16 with a determined flow rate corresponding to a beverage type the user selected. The control of the pump speed can happen, for example, by the power-line voltage of the pump 9. The power-line voltage of the pump can then be adjusted through an open- or closed-loop control. In case of open-loop control, the logical unit 19 adjusts, for example, the power-line voltage of the pump 9 with the voltage values stored in the memory of the unit 19 or in a memory connected thereto and corresponding to all possible values of the desired flow rate. In case of closed-loop control, there is at least one flow rate sensor (a flowmeter), through which the logical unit 19 determines the water flow rate flowing inside the duct 2. Then, by comparing such a flow rate value and the desired flow rate value, corresponding to the beverage type the user selected, the logical unit 19 adjusts consequently for example the power-line voltage of the pump 9.

Figure 5:
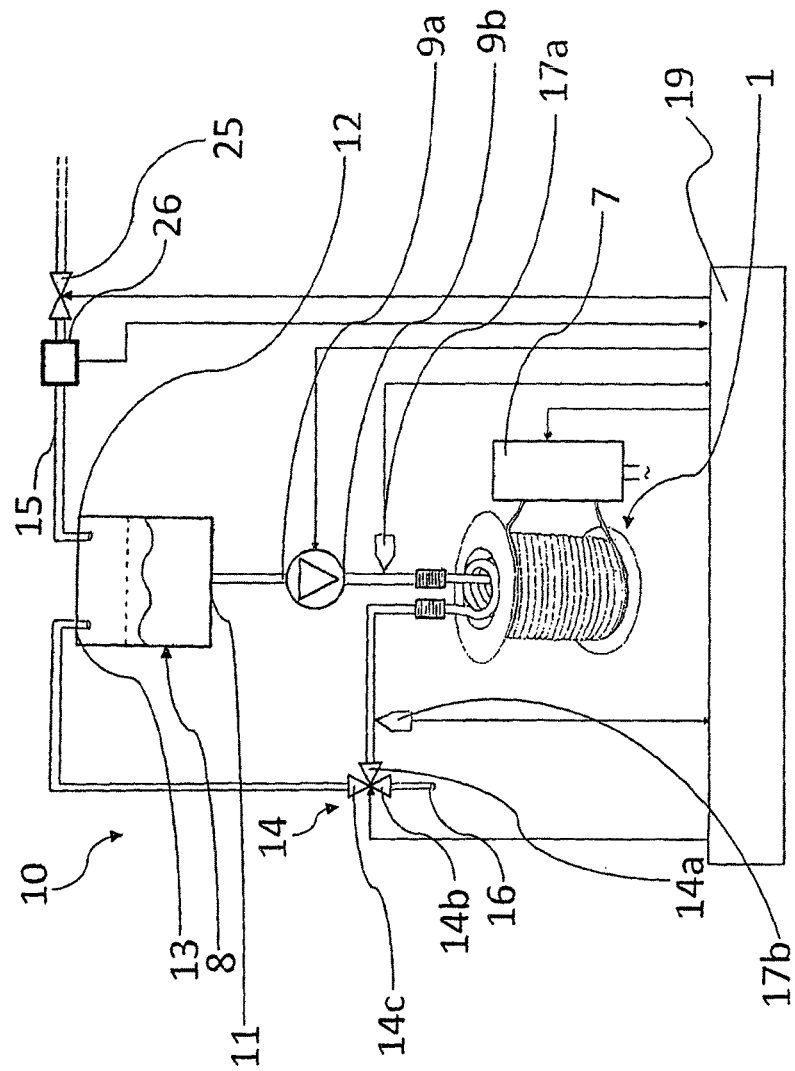
FIG. 5 is a block diagram of an additional embodiment of the feeding and heating assembly through which the method for feeding and heating water according to the present invention is carried out.

FIG. 5 shows another embodiment of the assembly 10 for feeding and heating water in a machine for making beverages. With respect to the embodiment shown in FIG. 4, the assembly 10 further comprises a separating chamber 8 with at least one inlet 12, 13 and one outlet 11 for the water and one three-way electrovalve 14.

Referring to FIG. 5, the separating chamber 8 preferably comprises two inlets for the water: a first inlet 12 hydraulically connecting the chamber 8 with a duct 15 connected to the water main via the electrovalve 25; a second inlet 13 hydraulically connecting the chamber 8 with the outlet 2b of the duct 2 in order to heat the water. In this way it is possible to put the water coming from the water main 15 and/or the outlet 2b of the heating duct 2 into the separating chamber 8.

The outlet 11 of the separating chamber 8 is hydraulically connected to the inlet 9a of the pump 9. Similarly to the embodiment shown in FIG. 4, the outlet 9b of the pump 9 is hydraulically connected to the inlet 2a of the duct 2 and at least one displacement meter 26 is connected upstream the inlet 2a of the heating duct 2, preferably upstream the inlet 9a of the pump 9, more preferably upstream the first inlet 12 of the separating chamber 8.

The three-way electrovalve 14 comprises an inlet 14a, a first outlet 14b and a second outlet 14c. The inlet 14a is hydraulically connected to the outlet 2b of the duct 2; the outlet 14b is hydraulically connected to an outlet duct 16 from which the assembly 10 feeds the water heated by the device 1; the outlet 14c is hydraulically connected to the inlet 13 of the separating chamber 8.

By switching the paths in the electrovalve 14, the flow of heated water can be diverted from the outlet 2b of the duct 2 towards the separating chamber 8 or the outlet duct 16. In the first case, the heated fluid can be returned into the chamber 8 for carrying out one or more pre-heating cycles if the temperature of water present in the separating chamber 8 is too low with respect to the temperature at which it has to be fed or else if the flow rate of hot water to be fed is too high.

In particular, the electrovalve 14 can switch so as to avoid the water flow towards at least one of the two outlets 14b, 14c. In particular, by controlling the closing of the outlet 14c and the opening of the outlet 14b, the electrovalve 14 allows the passage of water towards the outlet duct 16 and blocks the water passage between the duct 2 and the second inlet 13 of the separating chamber 8; vice versa, by controlling the opening of the outlet 14c and the closing of the outlet 14b, the electrovalve 14 blocks the water passage between the outlet 2b of the duct 2 and the outlet duct 16, then the water is not fed to the duct 16 but it flows towards the inlet 13 of the separating chamber 8.

As afore described for the embodiment shown in FIG. 4, the logical unit 19 adjusts the oscillation frequency and the electric power output of the power circuit 7; then, through the temperature sensors 17a and 17b, the logical unit 19 determines the temperature of water flowing inside the heating duct 2 and adjusts the oscillation frequency and/or the electric power output of the power circuit 7 so that the temperature of water flowing inside the duct 2 reaches a determined temperature selected by the user.

The logical unit 19 determines, by means of at least one displacement meter 26, the volume of water pumped to the duct 2 by the pump 9. In addition, the logical unit 19 can determine the water flow rate and, in case in which the pump 9 has a variable speed, the logical unit 19 further adjusts the speed of the pump 9 in the same way afore described for the embodiment shown in FIG. 4, i.e. in such a way that the water pumped inside the duct 2 has a determined flow rate corresponding to the beverage type to be made.

Referring to FIG. 5, the logical unit 19 further controls the switching of the electrovalve 14. As afore described, if the hot water to be fed to the duct 16 must reach high temperatures and/or flow rates, it is possible to carry out one or more pre-heating cycles; in this case, the logical unit 19 controls the closing of the outlet 14b and the opening of the outlet 14c. Therefore, the water is not immediately fed from the outlet duct 16 but it is circulated between the heating duct 2 and the separating chamber 8 until the water, present in chamber 8, will reach such a determined pre-heating temperature value that the pre-heated water can be led to the desired temperature during the subsequent heating cycle. Such a temperature value is determined by the logical unit 19 based on the selected beverage and the difference between the measured temperature value and the desired temperature value that the hot water must have to be fed to the outlet duct 16. As such a temperature value is reached, the logical unit 19 controls the opening of the outlet 14b and the closing of the outlet 14c to carry out the heating cycle and feed the hot water to the outlet duct 16 at the desired temperature and flow rate.

The method steps for feeding and heating the water through the assembly 10 in a machine for making beverages are now described, according to a preferred embodiment of the present invention.

At the beginning, an user selects the beverage type and, in case, the temperature of the beverage the machine must prepare; for every beverage type, a determined water volume and, in case, a determined water flow rate are associated, to be fed and heated up to the selected temperature by the assembly 10. Therefore, the logical unit 19, according to the beverage type and the temperature of water the assembly 10 must fed to the outlet duct 16, switches the electrovalve 14 in order to have an appropriate heating cycle.

In particular, in case in which a long heating cycle has to be carried out, i.e. with a pre-heating of the water to be heated (embodiment shown in FIG. 5), the logical unit 19 switches the electrovalve 14 in the configuration in which the outlet 14b is open and the outlet 14c is closed. The logical unit 19 controls the opening of the electrovalve 25, then the water is put from the water main to the separating chamber 8 up to reach a determined level corresponding to the water amount necessary for preparing a determined beverage selected by the user.

When the desired level is reached, detected for example by the displacement meter 26, the logical unit 19 controls the closing of the electrovalve 25 and the switching-on of the pump 9 so that the water is pumped from the outlet 11 of the separating chamber 8 towards the inlet 2a of the duct 2.

In case in which a short heating cycle has to be carried out, i.e. with a direct dispensing from the outlet duct 16, the logical unit 19 only controls the opening of the electrovalve 25 and the switching-on of the pump 9 up to the end of the dispensing. The logical unit 19 then determines, by means of the displacement meter 26, the volume of water pumped to the duct 2 and stops the dispensing when a determined water volume corresponding to the particular beverage type the user selected, is fed to the outlet duct 16.

In an additional embodiment, the logical unit 19 further determines the flow rate of water pumped to the duct 2 and, in case in which the pump 9 has a variable speed, the logical unit 19 further adjusts the speed of the pump 9 so that the water flows inside the duct 2 with a flow rate adapted to the beverage type the user selected. Afterwards, a determined water amount with a determined flow rate flows inside the duct 2 between the inlet 2a and the outlet 2b.

The water flowing inside the duct 2 is then heated by means of the device 1. In fact, the logical unit 19 controls the switching-on of the power circuit 7 that supplies the winding of electromagnetic induction 3 with a determined power and an AC voltage having an oscillation frequency equal to the resonance frequency. The oscillation frequency of the circuit 7 supplying the winding 3 is adjusted by the logical unit 19 and, by changing the oscillation frequency of the power supply 7, the temperature of water flowing inside the duct 2 can be adjusted. At the beginning, the logical unit 19 determines the resonance frequency and adjusts the oscillation frequency of the circuit 7 to such a frequency.

The logical unit 19 determines, through the sensors 17a and 17b, the temperature of water inside the duct 2. If the temperature value determined by the sensors 17a and 17b is different from the temperature selected by the user, the logical unit 19 adjusts the oscillation frequency of the circuit 7 and/or the power supplied by the circuit 7 to the winding 3 so that the water inside the duct can reach the selected temperature. As afore described, the oscillation frequency is higher than 20 kHz, so that vibrations made by the device 1 will fall within the ultrasound field, beyond the audible frequencies. The logical unit 19 adjusts accordingly the oscillation frequency of the circuit 7 in a range in which the frequencies are higher than 20 kHz, preferably higher than the resonance frequency. Such a resonance frequency, for example in one of the afore described embodiments, has a value of about 25 kHz. In case in which the temperature sensors 17a and 17b detect a temperature higher than an upper determined threshold, the logical unit 19 controls the switching off of the power circuit 7 or, vice versa, in case in which the temperature sensors 17a and 17b detect a temperature lower than a determined lower threshold, the logical unit 19 controls the switching-on of the power circuit 7.

The hot water is then fed to the outlet duct 16 at the temperature the user selected and, in case, with the flow rate corresponding to the beverage type the user selected. The control logical unit 19 adjusts the oscillation frequency of the circuit 7 and/or the power supplied by the circuit 7 to the winding 3 until all the water in the separating chamber 8 has been fed to the outlet duct 16, so that the water temperature is maintained constant and equal to the value selected by the user.

In case in which the temperature and the flow rate of water to be fed are high, the method provides for the possibility of carrying out one or more heating cycles of water present in the separating chamber 8. In this case, the logical unit 19 determines the temperature of water in the separating chamber through the sensor 17a or 17b and, if such a temperature value is lower than a determined value of pre-heating temperature, the logical unit 19 switches on the electrovalve 14 by controlling the closing of the outlet 14b and the opening of the outlet 14c; then a determined water amount with a determined flow rate flows between the heating duct 2 and the separating chamber 8 leading it to such a pre-heating temperature that the water can be led to the desired temperature during the subsequent heating step.

In other words, the subsequent heating step is equal to that of the embodiment shown in FIG. 4, but at the inlet 2a of the duct 2, pre-heated water is pumped at a specific value of pre-heating temperature. The pre-heating temperature is determined by the logical unit 19 according to the beverage type selected by the user and as a function of the difference between the temperature value measured by the sensor 17a or 17b and the desired temperature value. Once the water reached the pre-heating temperature, the logical unit 19 controls the opening of the outlet 14b and the closing of the outlet 14c thereby carrying out the heating cycle in which the pre-heated water flows again in the duct 2, is heated and fed to the outlet duct 16 at the desired temperature and flow rate.

At the end of the feeding, both the pump 9 and the power circuit 7 are switched off and the whole hydraulic circuit of the assembly 10 is empty, i.e. without water in its inside and ready for starting a new feeding and heating cycle.

Advantageously, the logical unit 19 controls the switching off of the power circuit 7 just before all the water present in the hydraulic circuit of the assembly 10 has been fed to the outlet duct 16. In this way, the last part of the water flow (not many cc) is heated thanks to the thermal inertia of the duct 2 that is also advantageously cooled. The method can provide also a rinsing step of the whole hydraulic circuit, with cold water at the end of every cycle, in order to eliminate possible limescale deposits inside the duct 2.

The present invention can provide embodiments different from those heretofore described and shown in figures; for example, referring to the geometrical shape of the duct 2, it has to be observed that an embodiment, comprising a straight duct 2 or a duct 2 having an U-shape or a flat spiral shape, falls again within the protection scope of the present invention.

An embodiment in which the duct 2 is realized in the shape of several cylindrical spirals, one in another, is provided too.

Additional embodiments having a different number of metal ducts 2, made of different types of materials, still fall within the protection scope of the present invention.

Other embodiments can anyway provide for a different geometrical shape of the spool 4 and/or the cavity 5 and/or the winding 3 of electromagnetic induction. Additional embodiments can provide for the presence of a metal duct 2, housed inside a cavity 5, in which the symmetry axes of the insulating spool 4 and/or the winding of electromagnetic induction 3 and/or the cavity 5 and/or the metal duct 2 are not coincident, even though remaining in the protection scope of the present invention.

The geometrical shape and the symmetry of the whole structure have been selected for a better easiness of implementation and description of the present invention.

Another embodiment is provided in which the duct 2 is sheathed on the outside with some insulating material; in this case, the insulating coating and the spool 4 are separated at least partially by a gap inside the cavity 5 so that such a duct 2 with the coating can loosely slide inside the cavity 5 of the spool 4. Also in this case, both the duct 2 and the spool 4 are separated at least partially by a gap, i.e. the space allowing the loose sliding between the thermally insulating coating and the spool 4.

Another embodiment of the assembly 10 can provide for a separating chamber 8 provided with at least one heating element placed in its inside for pre-heating the water coming from the duct 15. In this case, the water is pre-heated inside the separating chamber 8 up to reach a determined pre-heating temperature without carrying out a pre-heating cycle through the heating duct 2.

The invention claimed is:

1. An apparatus comprising a machine for preparing and dispensing beverages,
said machine including a device for heating water, said device comprising at least one metal duct for water flow between a duct inlet and a duct outlet and at least one winding of electromagnetic induction, wherein loops of said winding are wound around a spool made of an electrically insulating material having a cavity inside which said metal duct is housed, and wherein an outer surface of said metal duct and an inner surface of said spool are separated by an air gap inside said cavity, said air gap extending uninterrupted from said outer surface of said metal duct to said inner surface of said spool.

2. The apparatus according to claim 1, wherein said at least one metal duct has a spiral shape.

3. The apparatus according to claim 1, wherein said at least one metal duct is made of ferromagnetic material.

4. The apparatus according to claim 1, wherein said duct inlet and said duct outlet for the water flow are placed on the same end of said at least one metal duct.

5. The apparatus according to claim 1, further comprising at least one electric power supply circuit applying an AC voltage at a frequency higher than 20 kHz between the terminals of said winding of electromagnetic induction.

6. The apparatus according to claim 1, wherein said at least one metal duct has a spiral shape, is made of ferromagnetic material, and said duct inlet and said duct outlet are disposed on the same end of said at least one metal duct.

7. The apparatus according to claim 1 wherein said machine further comprises a logical unit that determines water flow rate through said at least one metal duct based on a beverage type selected.

8. The apparatus according to claim 7, wherein the logical unit further maintains a temperature of said water based on a temperature value selected by a user.

9. The apparatus according to claim 7, wherein said machine further comprises a pump and the logical unit controls the water flow rate by controlling the pump.

10. The apparatus according to claim 1, further comprising at least one separating chamber with at least one chamber inlet and one chamber outlet for the water, said at least one chamber outlet in fluid communication with said duct inlet.

11. An assembly for supplying and heating water in a machine for preparing beverages, comprising at least one pump with a pump inlet and a pump outlet, a duct for the water supply and an outlet duct, the assembly characterized by comprising the apparatus for heating water according to claim 1.

12. The assembly according to claim 11, further comprising at least one temperature sensor disposed proximate said duct outlet.

13. The assembly according to claim 12, further comprising a logical unit for controlling an electric power supply circuit, wherein said logical unit is further adapted to control the pump and to acquire temperature values measured by said at least one temperature sensor.

14. The assembly according to claim 13, wherein said logical unit is further adapted to switching said three-way electrovalve for opening and/or closing at least one of said first and second electrovalve outlets.

15. The assembly according to claim 11, further comprising a logical unit for controlling an electric power supply circuit, wherein said logical unit is further adapted to control the pump and to acquire temperature values measured by at least one temperature sensor disposed proximate said duct outlet.

16. An assembly for supplying and heating water in a machine for preparing beverages, comprising at least one pump with a pump inlet and a pump outlet, a duct for water supply and an outlet duct, the assembly characterized by comprising a device for heating water in said machine, said device comprising at least one metal duct for water flow between a duct inlet and a duct outlet and at least one winding of electromagnetic induction, characterized in that loops of said winding are wound around a spool made of an electrically insulating material having a cavity inside which said metal duct is housed and in that said metal duct and said spool are at least partially separated by a gap inside said cavity, further comprising at least one separating chamber with at least one chamber inlet and one chamber outlet for the water, wherein said pump inlet is hydraulically connected with said chamber outlet and said pump outlet is hydraulically connected with said duct inlet.

17. The assembly according to claim 16, further comprising a three-way electrovalve with an electrovalve inlet, a first electrovalve outlet and a second electrovalve outlet, wherein said duct outlet is hydraulically connected with said electrovalve inlet of said electrovalve, said three-way electrovalve being adapted to divert selectively water flow from the duct outlet of said device towards said at least one chamber inlet of said separating chamber or towards said outlet duct.

18. An apparatus comprising a machine for preparing and dispensing beverages, said machine including a device for heating water and a recirculation system, said device comprising at least one metal duct for water flow between a duct inlet and a duct outlet and at least one winding of electromagnetic induction, wherein loops of said winding are wound around a spool made of an electrically insulating material having a cavity inside which said metal duct is housed and said metal duct and said spool are at least partially separated by an air gap inside said cavity that extends uninterrupted from said metal duct to said spool, said recirculating system including a temperature sensor for sensing a temperature of water exiting said duct outlet and a three way valve for directing said water exiting said duct outlet, to a separating chamber upstream from said at least one metal duct.

19. The apparatus according to claim 18, wherein said recirculating system includes a logical unit that maintains a temperature of said water in said separating chamber at a determined pre-heating temperature.

\* \* \* \* \*